R. Hamilton.

Road Scraper.

N° 86,223. Patented Jan. 26, 1869.

Witnesses,
Jas. H. Layman
Sam'l Knight

Inventor,
R. Hamilton
By Knight Bro's
Att'ys.

UNITED STATES PATENT OFFICE.

ROBERT HAMILTON, OF FRANKLIN, INDIANA.

IMPROVED ROAD-SCRAPER.

Specification forming part of Letters Patent No. 86,223, dated January 26, 1869.

*To all whom it may concern:*

Be it known that I, ROBERT HAMILTON, of Franklin, Johnson county, Indiana, have invented a new and useful Road-Scraper; and I hereby declare the following to be a full, clear, and exact description thereof, reference being had to the accompanying drawings, making part of this invention.

This is an improvement in the class of road-scrapers whose scoop is adapted to be drawn along the surface of the ground in the operation of grading and leveling roads, &c.; and my invention consists in an arrangement of shovel or scoop which, when in the act of gathering rocks or earth, is upheld and guided by a peculiarly-formed shoe or sole plate, the load thus acquired being capable of being instantaneously tilted or dumped when brought to the proper place for that purpose.

Figure 1:
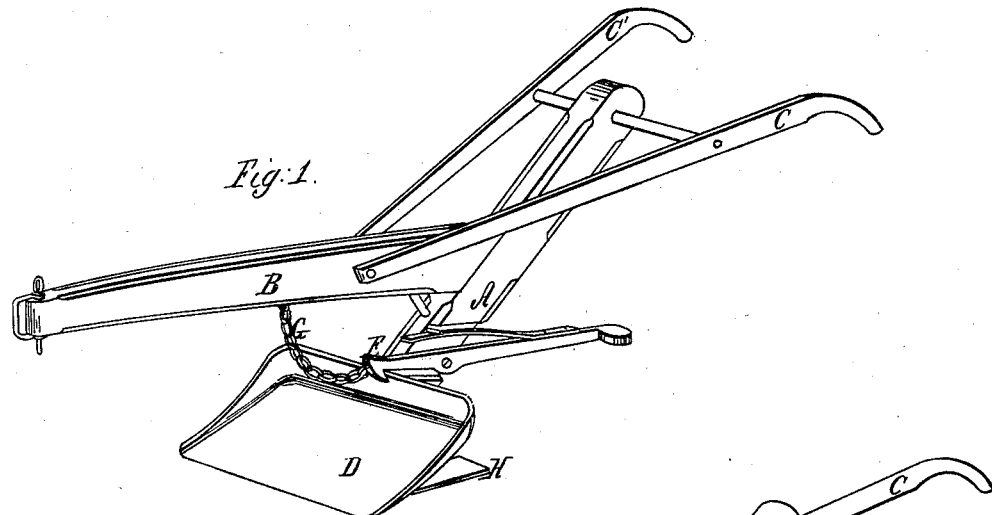
Figure 2:
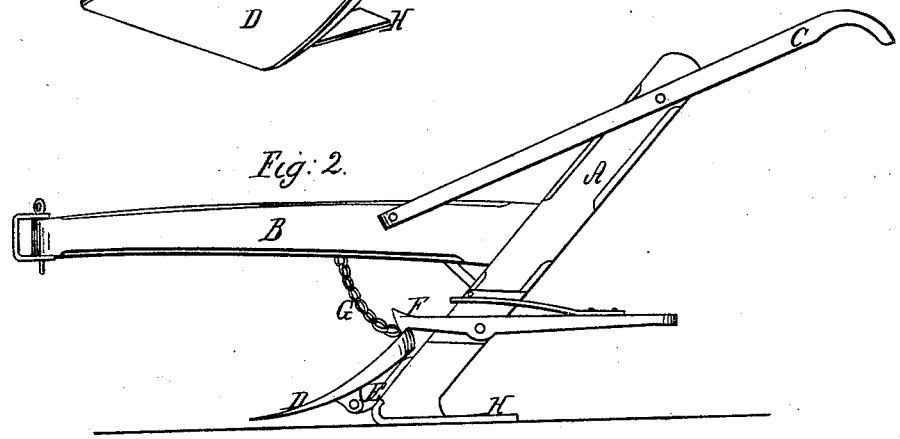
Figure 3:
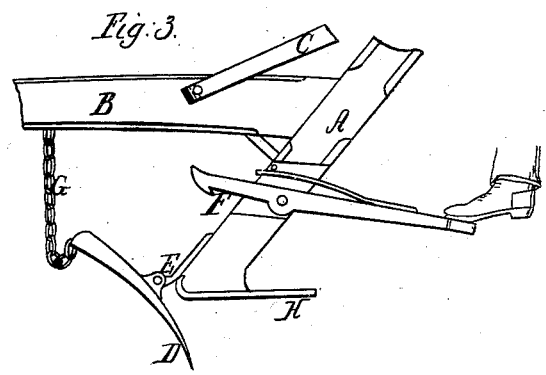

Figure 1 is perspective view of my improvement. Fig. 2 is a side elevation of the same. Fig. 3 is a similar elevation of the operative parts in their position of dumping or discharging the load.

A, B, and C C' represent respectively the sheth, beam, and handles constituting the wooden portion of a road-scraper.

The scoop or shovel D, instead of being rigidly attached to the sheth or standard, is hinged thereto at about the middle of its rear portion by means of a T-bar, E, made fast to the front side of the sheth.

F is a spring-latch, which, engaging over the top edge of the shovel, holds it to its filling position until released by means of the foot, as shown in Fig. 3.

A chain, G, extending from the beam to the upper part of the shovel, serves to limit its play in the act of dumping, and to hold it in a suitable position for leveling the loose earth.

Attached to the bottom of the sheth is a shoe, H, of iron or steel, adapted to rest and slide upon the ground behind the scoop. The said shoe is so attached as to rest horizontally upon that portion of the ground which has been leveled by the scraper, and assists to hold the implement level and to a direct course. The said shoe also assists the operator in holding the scoop clear of the ground for conveyance of its load of earth to the place of deposit. The scoop, when full, being conducted to the desired "fill," the operator releases the scoop by depressing the spring-latch with his foot, as shown in Fig. 3, and slightly raises the handles, whereupon the advance of the implement serves to tilt the scoop in the manner shown.

I claim herein as new and of my invention—

The described arrangement of scoop D, hinge E, spring-latch F, chain G, and shoe H, for the purpose set forth.

In testimony of which invention I hereunto set my hand.

ROBERT HAMILTON.

Witnesses:
  GEO. H. KNIGHT,
  JAMES H. LAYMAN.